UNITED STATES PATENT OFFICE.

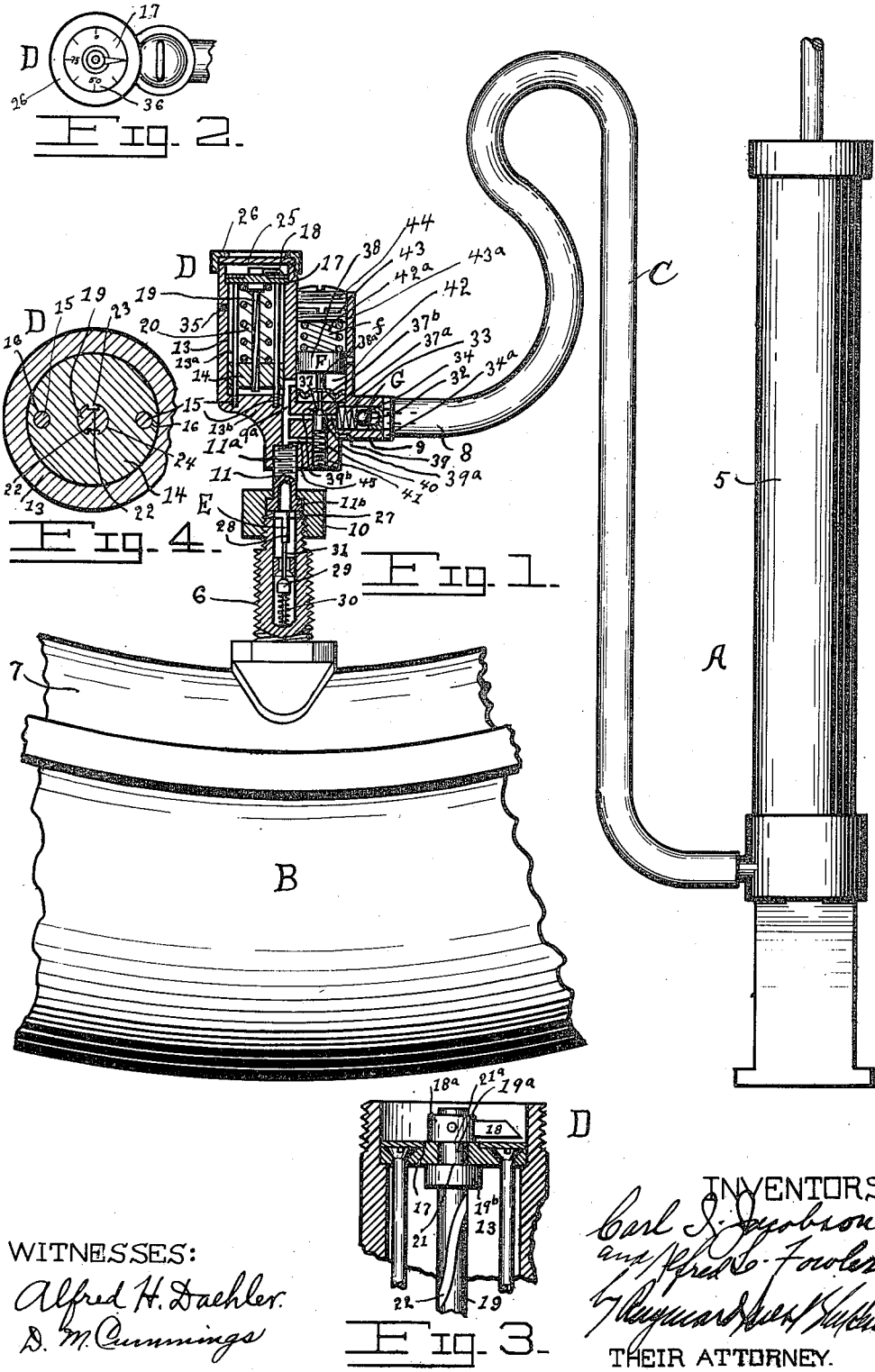

CARL I. JACOBSON AND ALFRED L. FOWLER, OF LOS ANGELES, CALIFORNIA.

PRESSURE CONNECTION AND GAGE.

1,268,467. Specification of Letters Patent. Patented June 4, 1918.

Application filed August 24, 1914. Serial No. 858,232.

*To all whom it may concern:*

Be it known that we, CARL I. JACOBSON, a subject of the King of Norway, who has declared his intention of becoming a citizen of the United States, and ALFRED L. FOWLER, a citizen of the United States, residing at Los Angeles, in the county of Los Angeles and State of California, have jointly invented new and useful Improvements in Pressure Connections and Gages, of which the following is a specification.

This invention relates to pressure connections and gages, and it has for its object to provide an improved device of this character whereby the pressure within pneumatic tires or other inflated bodies may be readily and accurately determined, and whereby connection of such pneumatic tires or the like with a source of compressed air may be made.

Particularly, the improved device is adapted and intended for connection with the tire or the like to be inflated so that the rise of pressure may be noted by reference to the gage, to the end that when a predetermined degree of pressure in the tire is reached the pumping or supplying of further air may be discontinued. Specifically, the device comprises a pump connection and a gage adapted to be attached to the tire, preferably upon the valve nipple, whenever it becomes necessary to introduce a fresh supply of air, means being provided whereby the tire valve is unseated while the device is in attached position, other means being provided to prevent the escape of air through the device.

Another object of the invention is to provide an improved pump connection which will automatically cut off the supply of air when the pressure in the tire reaches a predetermined point.

The invention has for further objects the provision of an improved device of the general character stated which will be superior in point of relative simplicity and inexpensiveness of construction, lightness in weight, compactness in form, facility in connection and disconnection, positiveness and accuracy in operation, convenience in use, and which will be generally superior in efficiency and serviceability.

With the above and other objects in view, the invention consists in the novel and useful provision, formation, construction, combination, association and relative arrangement of parts, members and features, all as hereinafter described, shown in the drawing, and finally pointed out in claims.

In the drawing:

Figure 1 is a central vertical sectional view of a combined pressure connection and gage, constructed, organized and applied in accordance with the invention, the same being shown as operatively connected to a pneumatic vehicle tire nipple;

Fig. 2 is a plan view of the gage;

Fig. 3 is an enlarged detail sectional view of a portion of the showing in Fig. 1; and Fig. 4 is an enlarged sectional detail view of a portion of the showing in Fig. 1.

Corresponding parts in all the figures are designated by the same reference characters.

Referring with particularity to the drawing, in the embodiment of the invention therein shown, A and B designate, respectively, a suitable source or supply of compressed air and a pneumatic vehicle tire to be inflated, C designates connecting means, D designates pressure indicating means, E designates means for unseating the tire valve, F designates means for automatically cutting off the air supply, means for preventing the escape of air being designated by G.

The source of compressed air A is shown as a pump 5 connected to the usual nipple 6 of the tire B, such nipple extending through the felly 7 of the vehicle wheel, the connecting means C being shown as comprising a flexible hose 8 and a hollow body 9 onto which is swiveled a knurled nut 10, and which houses the pressure indicating means D and the automatic cut-off means F. A hollow swivel stem 11 passes through the knurled nut 10 and is threaded into the body 9 as at 11ᵃ. The swivel stem 11 is provided with a head 11ᵇ which is accommodated within the nut 10.

The pressure indicating means D comprises a cylinder 13 which is preferably made integral with the body 9, a piston 14 slidable therein and prevented from rotating by screws or pins 15 which range longitudinally of the cylinder bore 13ᵃ and pass through suitable bores 16 in the piston 14, the pins being secured at one end in the cylinder head 13ᵇ and having mounted on their other ends a dial 17, a pointer 18 which co-acts with the dial, a grooved spindle 19, and a spring 20 which is coiled about the grooved spindle and resists movement of the piston 14. The interior of the cylinder behind the piston communicates with an air duct 9ª provided in the body 9, the hollow swivel stem 11 and the cut-off means F also communicating with the duct 9ª. The pointer 18 is secured to one end of the grooved spindle 19 which is journaled in the dial as at 19ª, end thrust bearings 21 and 21ª being formed by an enlargement 19ᵇ of the spindle and the hub 18ª of the pointer 18. The grooves 22 formed in the spindle 19 are helical and are preferably two in number, and each of the same co-acts with one of the tongues 23 extending into a central bore 24 provided in the piston 14. A glass 25 may be secured over the pointer and dial in any preferred manner, as by a ferrule 26.

The means E for unseating the tire valve preferably consists of an annulus 27 provided with an inwardly extending finger 28 bent to extend along the axis of the annulus 27, which annulus is fitted into the knurled nut 10 where it may serve to hold the swivel stem 11 and the nut 10 in proper assemblage. The finger 28 is shown as holding open the tire valve 29 against its spring 30 and against the air pressure within the tire, by contacting with and depressing the valve stem 31.

The automatic cut-off means F comprises a valve 37 having a hemispherical head 37ª and provided with a stem 37ᵇ, adjustable resilient means f for unseating the valve 37, and a piston 38 actuated by pneumatic pressure, for opposing the action of the resilient means f. The body 9 is provided with an air passage 39 leading from the hose 8 to the air duct 9ª, the passage 39 having a transverse chamber 39ª in which the valve 37 plays, the valve head 37ª seating against the end wall 39ᵇ of the chamber to cut off the supply of air. The valve 37 is pressed toward its seat by a spring 40 held in place in the chamber 39ª by a screw plug 41. The valve stem 37ᵇ extends through the end wall 39ᵇ of the chamber 39ª into a cylinder 42 formed integral with the body 9 and in which is slidably fitted the piston 38. The piston 38 is provided with a stem or finger 38ª which is adapted to depress the valve stem 37ᵇ to move the valve 37 from its seat, a flexible partition diaphragm x being interposed between the finger 38ª and the valve stem 37ᵇ. The resilient means f preferably consists of a coiled spring 42ª which is tightened against the upper side of the piston 38 by means of a plug 43 which is threaded into the cylinder 42 as at 43ª. A closing plug 44 is threaded into the cylinder 42 behind the plug 43. To assist the spring 40 in forcing the valve 37 to its seat when the cut-off point is reached, an air duct 45 leads from the duct 9ª to the chamber 39ª at the under side of the valve 37.

The means G to prevent escape of air from the tire through the device consists of a check valve 32 held by a spring 33 against its seat 34 which is formed in a plug 34ª which also serves as a hose connection for the hose 8.

To prevent the formation of an air cushion in the cylinder 13 forward of the piston 14 a vent 35 is provided in the cylinder wall. The dial is suitably calibrated and provided with numerals as at 36.

The method of use and advantages of the invention will be understood from the foregoing description taken in connection with the following statement.

When it is desired to inflate a tire or the like, or augment the air under pressure therein by the addition of further air, or to determine the existing pressure within the tire, the swiveled nut 10 is threaded onto the tire nipple 6 the finger 28 forcing open the tire valve allowing air from the tire to enter the gage, thus permitting the user of the device to immediately determine the pressure by the readings on the gage, and as further air is supplied the rise in pressure may be continuously noted. The check valve 32 allows the introduction of further air at a pressure greater than that already in the tire, but prevents the escape or loss of any air or return flow in the direction of the supply. When the nut 10 is unscrewed and the device removed from the tire nipple the tire valve is immediately seated by its spring and the pressure of the air in the tire. When the pressure in the tire and consequently in the gage cylinder 13 and in the cylinder 42 reaches a predetermined point, dependent upon the adjustment of the spring 42, the piston 38 is moved against the spring 42 and the finger 38ª allows the valve 37 to seat under the combined action of the spring 40 and the air pressure. It will be understood that while the pressure in the tire is below the predetermined point the valve 37 will be held from its seat by the finger 38ª and its stem 37ᵇ so that air may enter the tire and the device by passing around the hemispherical valve head 37ª, but that when the cut-off point is reached the seating of the valve 37 will close the air passage 39.

Having thus disclosed our invention, we claim and desire to secure by Letters Patent:

1. A device of the character disclosed, comprising a hollow body adapted to be applied to a device to be inflated, a check valve for the hollow body preventing the passage of air therethrough in one direction, and automatic cutoff means for cutting off the supply of air; said automatic cutoff means comprising a cutoff valve adapted to be moved transversely above an air supply passage provided in said body, means urging said valve in the direction to cut off the air supply, and yielding means resisting said urging means and adapted to be overcome by the air pressure in said body when a predetermined pressure is reached, whereby seating of said cutoff valve is permitted.

2. A device of the character disclosed, comprising a hollow body divided into separate cylinders having parallel axes, said body having an air inlet communicating with both of said cylinders and adapted to receive air from the source of supply, said body having an outlet communicating with both cylinders to the inlet, a valve for controlling the passage of air from the inlet to the cylinders and outlet and being normally held open, means tending to close said valve, means within one of the cylinders for controlling the movement of said valve being in turn controlled by back pressure of air in said cylinder, and a gage means in the other cylinder.

3. A pressure connection and gage, comprising a single housing having an air inlet and an air outlet, a cut-off device within the housing and a gage within the housing, said gage and cut-off devices having parallel axes.

4. A device of the character disclosed, comprising a hollow body having an air intake and an air outlet and being divided into separate cylinders having parallel axes, conduits communicating the cylinders with one another and with the inlet and outlet respectively, said inlet adapted to be connected with a source of supply, said outlet adapted to be connected with a device to be inflated, means within one cylinder for indicating the pressure of air within a device which is being inflated, and means within the other cylinder for controlling, under the influence of said pressure, the amount of air passing through the conduits from the intake to the outlet.

5. A device of the character disclosed, comprising a hollow body having an air intake and an air outlet and being divided into separate cylinders, conduits communicating the cylinders with one another and with the inlet and outlet respectively, said inlet adapted to be connected with a source of supply, said outlet adapted to be connected with a device to be inflated, means within one cylinder for indicating the pressure of air within a device which is being inflated, and means within the other cylinder for controlling, under the influence of said pressure, the amount of air passing through the conduits from the intake to the outlet.

6. A device of the character disclosed, comprising a body portion having separate chambers therein and provided with an intake and an outlet, said body having a conduit communicating the chambers with one another and conduits communicating the intake and outlet respectively with the first named conduit, said outlet adapted to be connected with an object to be inflated, said intake adapted to be connected with the source of air supply, all of said means including the intake, outlet and chambers having a common housing provided by the body portion, a gage device mounted within one of the chambers, a valve for controlling the air passage through the conduits from the intake to the outlet, and means controlled by the back pressure within the other chamber for controlling the said valve, operating to automatically close said valve when a predetermined pressure is reached.

In testimony whereof, we have signed our names to this specification in the presence of two subscribing witnesses.

CARL I. JACOBSON.
ALFRED L. FOWLER.

Witnesses:
 ALFRED H. DAEHLER,
 G. ROY PENDELL.